United States Patent
Rai et al.

(10) Patent No.: US 10,080,173 B1
(45) Date of Patent: Sep. 18, 2018

(54) METHOD AND SYSTEM FOR USE OF OPERATING TEMPERATURE AS BASIS TO CONTROL HANDOVER

(71) Applicant: Sprint Spectrum L.P., Overland Park, KS (US)

(72) Inventors: Deveshkumar N. Rai, Overland Park, KS (US); Jasinder P. Singh, Olathe, KS (US); Naresh Madineni, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 87 days.

(21) Appl. No.: 15/092,333

(22) Filed: Apr. 6, 2016

(51) Int. Cl.
*H04W 52/00* (2009.01)
*H04W 36/26* (2009.01)
*H04W 72/04* (2009.01)
*H04L 12/26* (2006.01)

(52) U.S. Cl.
CPC ............. *H04W 36/26* (2013.01); *H04L 43/16* (2013.01); *H04W 72/048* (2013.01)

(58) Field of Classification Search
CPC ..... H04W 4/005; H04W 4/008; H04W 12/06; H04W 28/08; H04W 36/0005; H04W 36/0088

See application file for complete search history.

(56) References Cited

U.S. PATENT DOCUMENTS

| | | | | |
|---|---|---|---|---|
| 6,804,526 | B1 * | 10/2004 | Yarkosky | H04M 3/4872 340/539.28 |
| 7,203,494 | B2 * | 4/2007 | Flondro | H04W 36/30 455/436 |
| 7,565,106 | B1 * | 7/2009 | Oh | H04B 7/155 370/241 |
| 7,878,008 | B1 * | 2/2011 | Mateski | G01W 1/02 62/125 |
| 2006/0105769 | A1 * | 5/2006 | Flondro | H04W 36/30 455/437 |
| 2010/0273517 | A1 * | 10/2010 | Pinheiro | H04B 1/036 455/522 |

(Continued)

FOREIGN PATENT DOCUMENTS

JP    2008131414 A * 6/2008

OTHER PUBLICATIONS

3GPP Lte, "LTE; Evolved Universal Terrestrial Radio Access (E-UTRA); Radio Resource Control (RRC); Protocol specification (3GPP TS 36.331 version 13.0.0 Realease 13)," ETSI TS 136 331 V13.0.0 (Jan. 2016).

*Primary Examiner* — Mohamed Kamara

(57) ABSTRACT

A method and system for controlling handover of a WCD based on the WCD's operating temperature. In an example implementation, a determination is made that the WCD's operating temperature is threshold high, and that determination is used as a basis to trigger handover of the WCD to another coverage system, such as to another carrier frequency or to another base station coverage area. Further, in another example implementation, a determination is made that the WCD's operating temperature is threshold low (e.g., is not threshold high), and that determination is used as a basis to trigger handover of the WCD to another coverage system, such as back to the WCD's initially serving coverage system.

13 Claims, 6 Drawing Sheets

(56) References Cited

U.S. PATENT DOCUMENTS

| | | | |
|---|---|---|---|
| 2010/0285807 A1* | 11/2010 | Miller-Smith | H04W 36/30 455/437 |
| 2013/0017851 A1* | 1/2013 | Kim | H04W 72/048 455/509 |
| 2016/0164549 A1* | 6/2016 | Kim | H04W 88/06 455/41.2 |
| 2016/0262143 A1* | 9/2016 | Breuer | H04W 52/0258 |

* cited by examiner

METHOD AND SYSTEM FOR USE OF OPERATING TEMPERATURE AS BASIS TO CONTROL HANDOVER

BACKGROUND

Unless otherwise indicated herein, the description provided in this section is not itself prior art to the claims and is not admitted to be prior art by inclusion in this section.

A typical wireless communication system includes one or more base stations, each radiating to define one or more coverage areas, such as cells and cell sectors, in which wireless communication devices (WCDs) such as cell phones, tablet computers, tracking devices, embedded wireless modules, and other wirelessly equipped devices, can operate. Further, each base station of the system may then be coupled or communicatively linked with network infrastructure such as a switch and/or a gateway that provides connectivity with one or more transport networks, such as the public switched telephone network (PSTN) and/or the Internet for instance. With this arrangement, a WCD within coverage of the system may thus engage in air interface communication with a base station and thereby communicate via the base station with various remote network entities or with other WCDs served by the system.

In general, a wireless communication system may operate in accordance with a particular air interface protocol or radio access technology, with communications from a base station to WCDs defining a downlink or forward link and communications from the WCDs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communication (GSM), WI-FI, and BLUETOOTH. Each protocol may define its own procedures for registration of WCDs, initiation of communications, handover between coverage areas, and functions related to air interface communication.

In accordance with the air interface protocol, each of the one or more coverage areas of such a system may operate on one or more carrier frequencies and may define a number of air interface channels for carrying information between the base station and WCDs. By way of example, each coverage area may define a pilot channel, reference channel or other resource on which the base station may broadcast a pilot signal, reference signal, or the like that WCDs may detect as an indication of coverage and may measure to evaluate coverage strength. Further, each coverage area may define a downlink control channel for carrying system information, page messages, and other control signaling from the base station to WCDs, and an uplink control channel for carrying service requests and other control signaling from WCDs to the base station, and each coverage area may define downlink and uplink traffic channels or the like for carrying bearer traffic between the base station and WCDs.

When a WCD initially enters into coverage of a wireless communication system (e.g., powers on in coverage of the system), the WCD may detect a reference signal and read system information broadcast from a base station and may engage in a process to register itself to be served by the base station and generally by the system. For instance, the WCD may transmit an attach message on an uplink control channel to the base station, and the base station and/or supporting infrastructure may then responsively authenticate and authorize the WCD for service, establish a record indicating where in the system the WCD is operating, establish local profile or context records for the UE, and provide an attach accept message to the WCD. Thereafter, the WCD may then be served by the system in an idle mode or a connected/active mode. In the idle mode, the WCD may monitor a downlink control channel to detect page messages and other information regarding incoming communications and may similarly transmit uplink control signaling to initiate communications or for other reasons. In the connected/active mode, the WCD may have particular traffic channel resources assigned by the RAN, which the WCD may use to engage in communication of bearer traffic and the like.

When a WCD is served in a particular base station coverage area, the WCD may also regularly monitor the reference signal strength in that coverage area and in other coverage areas of the system, in an effort to ensure that the WCD operates in the best (e.g., strongest) coverage area. If the WCD detects threshold weak coverage from its serving coverage area and sufficiently strong coverage from another coverage area, the WCD may then engage in a handover process by which the WCD transitions to be served by the other coverage area. In the idle mode, the WCD may do this autonomously and might re-register in the new coverage area. Whereas, in the connected/active mode, the WCD may report signal strengths to its serving base station when certain thresholds are met, and the base station and/or supporting infrastructure may work to hand the WCD over to another coverage area.

Further, when a WCD is served by a base station in the connected/active mode, the WCD and base station may engage in a power control process to help manage the transmission power that the WCD uses for its transmissions to the base station. For example, the WCD may transmit to the base station at a particular transmission power level, and the base station may receive the WCD transmissions and compare a quality (e.g., signal strength or signal-to-noise ratio) of the received transmissions with a defined set point. If the base station thereby determines that the receive quality falls below the set point, then the base station may transmit to the WCD a power-up command to cause the WCD to incrementally increase its transmission power. Whereas, if the base station determines that the receive quality falls above the set point, then the base station may transmit to the WCD a power-down command to cause the WCD to incrementally decrease its transmission power. Meanwhile, the base station may also dynamically adjust the set point based on an evaluation of error level (e.g., frame error rate or bit error rate) in the received WCD transmissions, in an effort to ensure that the set point will be a good benchmark for the power control process to keep transmission errors within a tolerable level.

OVERVIEW

In general, a WCD may experience higher operating temperature as a result of the WCD engaging in higher-power uplink transmission.

Consequently, as a WCD moves to the distant edge of coverage of its serving base station, the WCD's operating temperature may increase as the WCD may need to transmit with higher power to have its transmissions successfully reach the base station. In particular, a power control process like that described above may cause the WCD to transmit at a higher power level as the WCD moves farther away from its serving base station.

Further, the path loss of a WCD's wireless transmissions to its base station may be proportional to the carrier frequency used for the WCD's transmission, with higher path loss on higher carrier frequencies and lower path loss on lower carrier frequencies. Consequently, if a WCD is operating on a relatively high carrier frequency, the WCD's operating temperature may be higher than it would be if the WCD were operating on a lower carrier frequency, since the WCD may need to transmit with higher power to overcome the higher path loss on the higher carrier frequency. In particular, the higher path loss on the higher carrier frequency may result in reduced receive-quality at the base station, and so a power control process like that described above may cause the WCD to transmit at a higher power level than the WCD would use on a lower carrier frequency.

In practice, higher transmission power and higher operating temperature of a WCD can create user experience issues. For instance, if a WCD is battery operated, higher transmission power could result in greater use of the WCD's battery power, which could in turn cause a user to have to charge the WCD's battery sooner. Further, if the WCD is handheld, higher operating temperature result in an uncomfortably warm WCD housing. Consequently, an improvement is desired.

Disclosed herein is a method and system for controlling handover of a WCD based on the WCD's operating temperature. In accordance with the disclosure, a determination will be made that the WCD's operating temperature meets a threshold condition, and that determination will be used as a basis to trigger handover of the WCD to another coverage system, such as to another carrier frequency or to another base station coverage area. In practice, the determination that the WCD's operating temperature meets a threshold condition could be a determination that the WCD's operating temperature is threshold high, which could suggest (rightly or wrongly) that the WCD is transmitting at a high power level. In that case, handing the WCD over to another carrier frequency or to another base station coverage area may enable the WCD to operate with reduced transmission power and thus possibly with reduced operating temperature. Further, in some situations, such as after handing the WCD over due to high WCD operating temperature, the determination that the WCD's operating temperature meets a threshold condition could be a determination that the WCD's operating temperature is threshold low (e.g., that the WCD's operating temperature is not threshold high), in which case it may be useful to hand back the WCD to the first coverage system or to hand over the WCD to another coverage system. Operating-temperature-based handover may also have other uses and advantages as well.

Accordingly, in one respect, disclosed is a method for controlling handover of a WCD. The method includes detecting that an operating temperature of the WCD meets a threshold condition. Further, the method includes, based at least on detecting that the operating temperature of the WCD meets a threshold condition, triggering handover of the WCD from being served by a first wireless coverage system to being served by a second wireless coverage system, where the wireless coverage systems could differ in terms of carrier frequency and/or physical coverage location for instance.

In addition, in another respect, disclosed is a WCD configured to control handover based on operating temperature of the WCD. The WCD includes (i) a wireless communication interface configured to communicate over an air interface with a base station serving the WCD, (ii) at least one temperature sensor configured to measure operating temperature of the WCD, and (iii) a controller configured to determine from the at least one temperature sensor the operating temperature of the WCD and, based at least in part on the determined operating temperature, to trigger handover of the WCD.

Still further, in yet another respect, disclosed is a base station configured to control handover of a WCD based on operating temperature of the WCD. The base station includes a wireless communication interface configured to communicate over an air interface with the WCD. And the base station includes a controller configured (i) to receive from the WCD via the wireless communication interface, when the base station is serving the WCD, a signaling message indicating that the operating temperature of the WCD is threshold high and (ii) based at least in part on the signaling message indicating that the operating temperature of the WCD is threshold high, to trigger handover of the WCD.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
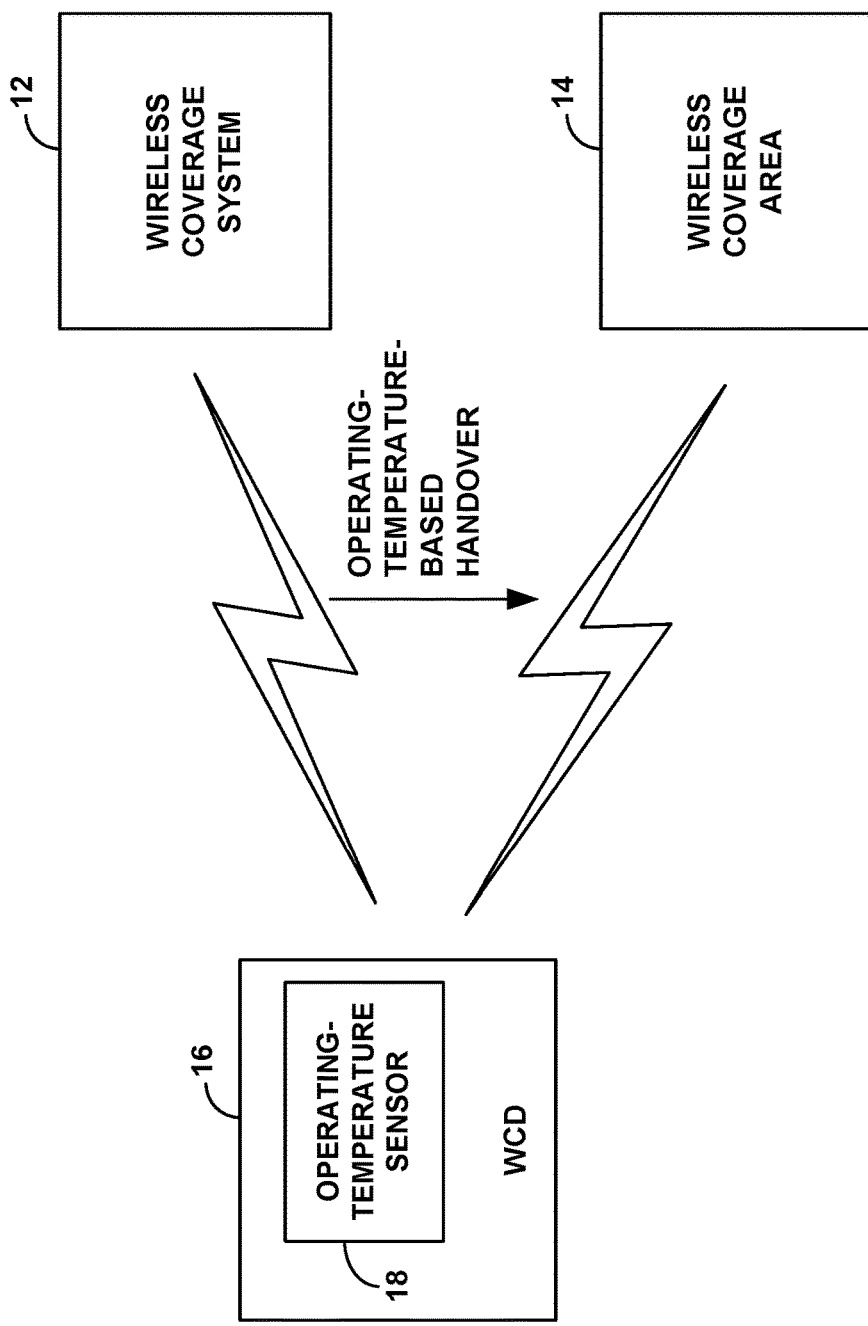
FIG. 1 is a simplified block diagram of an example wireless communication system in which features of the present disclosure can be implemented.

Referring to the drawings, as noted above, FIG. 1 is a simplified block diagram of an example wireless communication system in which features of the present disclosure can be implemented. It should be understood that this and other arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

The system of FIG. 1 includes two example wireless coverage systems 12, 14, both providing coverage at a location where a representative WCD 16 is positioned. Each coverage system provides respective wireless coverage, and the coverage systems may be provided by the same or different base stations and may differ from each other in various ways, such as by operating on different carrier frequencies than each other, providing coverage at different physical locations than each other, and/or providing coverage using different air interface protocols than each other. As further shown in FIG. 1, the WCD includes a representative temperature sensor 18 for measuring an operating temperature of the WCD.

With this arrangement, in practice, the WCD may be served by wireless coverage system 12, and may use temperature sensor 18 to determine its operating temperature. In turn, the WCD's determined operating temperature may then be used by the WCD, by wireless coverage system 12, and/or by one or more other entities, as a basis to trigger handover of the WCD from wireless coverage system 12 to wireless coverage system 14. For instance, the WCD or wireless coverage system 12 could determine that the WCD's determined operating temperature is threshold high and, possibly considering one or more other factors as well, could responsively trigger handover of the WCD from being served by wireless coverage system 12 to being served by wireless coverage system 14. Further, the WCD or wireless coverage system 12 could determine that the WCD's determined operating temperature is threshold low (e.g., that the WCD's operating temperature is not (e.g., no longer) threshold high) and, possibly considering one or more other factors as well, could responsively trigger handover of the WCD to another wireless coverage system (e.g., back to the wireless coverage system 12).

The present method and system will now be described by way of example primarily in the context of an LTE network. However, it will be understood that the disclosed principles could extend to apply in various other types of networks as well. Further, even within the context of LTE, numerous variations from the details disclosed are possible as well.

Figure 2:
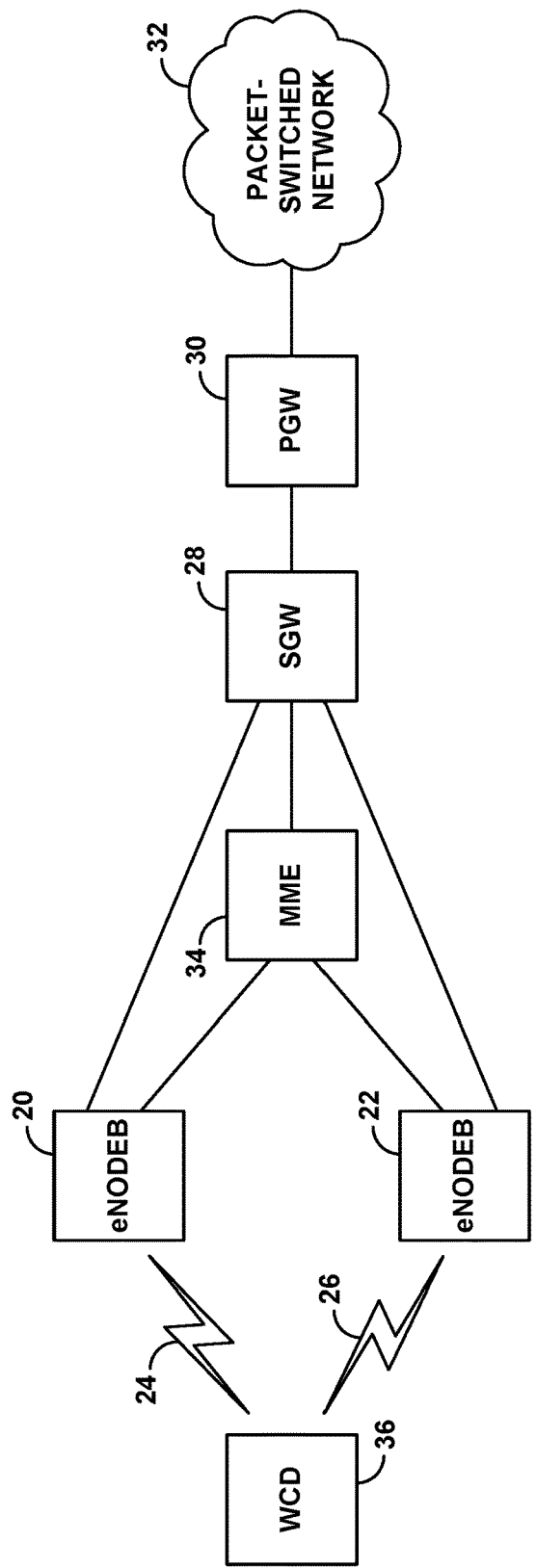
FIG. 2 is a simplified block diagram of an example LTE network in which features of the present disclosure can be implemented.

FIG. 2 is a simplified block diagram of a representative LTE network. As shown in FIG. 2, the LTE network includes two representative LTE base stations 20, 22 known as evolved Node B's (eNodeBs), each of which radiates to provide a respective LTE cell 24, 26, with a communication interface between the eNodeBs. These eNodeBs could have various form factors, such as being macro eNodeBs that provide widespread coverage, or small cell eNodeBs (e.g., femtocells, relay eNodeBs, or the like) that provide more limited coverage. In practice, the eNodeBs could be integrated together, such as by using a shared antenna structure and associated equipment, or the eNodeBs could be separate from each other. In line with the discussion above, the cells provided by these eNodeBs could differ from each other in various ways, such as by being on different carrier frequencies and/or being in different physical locations for instance.

As further shown, the LTE network includes a serving gateway (SGW) 28 having a communication interface with each eNodeB, and a packet data network gateway (PGW) 30 having a communication interface with the SGW and providing connectivity with a packet-switched transport network 32 such as the Internet for instance. Further, the LTE network includes a mobility management entity (MME) 34 having a communication interface with each eNodeB and a communication interface with the SGW.

In practice, the various illustrated nodes of the LTE network may each sit as nodes on a core packet-switched network operated by a wireless service provider, and thus the communication interfaces between the nodes could be logical interfaces or tunnels established in that core network. As such, each illustrated node may have a respective Internet Protocol (IP) address on the core network, so that the nodes can communicate with each other using their respective IP addresses.

In the arrangement of FIG. 2, a representative WCD 36 may initially attach with and be served by eNodeB 20 in cell 24. In particular, the WCD may detect coverage of cell 24 and may responsively engage in air interface access-channel signaling with eNodeB 20, triggering the establishment of signaling radio bearers (SRBs) over which the WCD can then engage in Radio Resource Control (RRC) connection signaling with the eNodeB to establish an RRC connection between the WCD and the eNodeB. Once the WCD has an established RRC connection with the eNodeB, the WCD may then transmit to the eNodeB, over an SRB, an attach request, which the eNodeB may forward to the MME for processing. Upon authenticating and authorizing the WCD for service, the MME may then engage in signaling with the SGW and eNodeB to establish for the WCD of one or more access bearers between the eNodeB and the PGW for carrying data between the WCD and the transport network 32.

With the RRC connection and access bearer(s) in place, the WCD is considered to be served by the eNodeB 20 (or by cell 24) in an RRC connected mode. In this mode, the eNodeB maintains a context record for the WCD and allocates air interface resources of cell 24 as necessary to carry data to and from the WCD. In particular, when data for the WCD arrives at the PGW from transport network 32, the data flows over an access bearer to eNodeB 20, and the eNodeB allocates downlink air interface resources to carry the data to the WCD and transmits the data to the WCD on the allocated downlink air interface resources. Likewise, when the WCD has data to transmit on network 32 and sends a scheduling request to the eNodeB, the eNodeB allocates uplink air interface resources to carry the data from the WCD, the WCD transmits the data to the eNodeB on the allocated uplink air interface resources, and the eNodeB forwards the data along an access bearer for transmission on network 32.

In addition, in the RRC connected mode, the WCD may regularly monitor the signal quality (e.g., signal strength and/or signal-to-noise ratio) of its serving cell and perhaps the signal quality of other cells that the WCD can detect, such as cell 26, and may provide measurement reports to its serving eNodeB. In practice, the WCD may provide these measurement reports periodically or in response to various measurement-reporting event triggers. For example, LTE defines the measurement-reporting event triggers shown in Table 1, among others.

TABLE 1

LTE Measurement Event Triggers

| Event Trigger | Condition |
|---|---|
| A1 | Serving cell quality becomes better than a threshold |
| A2 | Serving cell quality becomes worse than a threshold |
| A3 | Neighbor cell quality becomes better than serving cell quality by a threshold |
| A4 | Neighbor cell quality becomes better than a threshold |
| A5 | Serving cell quality becomes worse than threshold and neighbor cell quality becomes better than threshold |

The WCD may be pre-provisioned with these event triggers. Alternatively, the WCD's serving eNodeB may dynamically provision the WCD with the event triggers, such as by specifying the event triggers in a system parameter message (e.g., system information block (SIB) message) that the eNodeB broadcasts in the cell or by transmitting to the WCD an RRC connection reconfiguration message specifying the event triggers, and having the WCD responsively configure itself accordingly.

Whether periodically or in response to one of the event triggers, the WCD may thus from time to time transmit to its serving eNodeB a measurement report specifying measured signal quality of the serving cell and/or of one or more neighboring cells. To do this, the WCD may transmit to the eNodeB a scheduling request seeking allocation of uplink resources and, upon receipt of the resource allocation from the eNodeB, may then transmit the measurement report. In providing a measurement report that reports one or more measurements (e.g., serving cell signal quality and neighbor cell signal quality), the WCD may specify for each measurement a measurement-ID and a measurement value. The eNodeB may thus read the measurement report to determine each reported measurement.

In practice, the serving eNodeB may use such a measurement reports as a basis to trigger handover of the WCD from being served by the eNodeB to being served by another eNodeB. For example, if the WCD reports that the strength of its serving cell 24 is threshold low and the strength of neighboring cell 26 is threshold high, eNodeB 20 may responsively trigger handover of the WCD from being served by eNodeB 20 in cell 24 to being served instead by eNodeB 22 in cell 26.

Triggering handover of the WCD may involve invoking a process to orchestrate the handover or to otherwise cause the handover to occur. By way of example, to hand over the WCD from eNodeB 20 to eNodeB 22, eNodeB 20 may generate and transmit to eNodeB 22 a handover request signal that requests the handover. With further signaling and reservation of resources, eNodeB 22 may then send a handover response signal to eNodeB 20. And eNodeB 20 may then transmit to the WCD an RRC connection reconfiguration message directing the WCD to transition from being served by eNodeB 20 to instead being served by eNodeB 22.

As explained above, the present disclosure provides for using WCD operating temperature as a handover trigger. To facilitate this in practice, the WCD may be configured to measure its operating temperature, and the WCD may be configured further with a new measurement-reporting event trigger keyed to WCD operating temperature. This event trigger could be deemed "T1" and could have a corresponding measurement-ID to facilitate measurement reporting in the manner described above. Thus, when the WCD detects that its operating temperature is higher than a threshold, the WCD could responsively generate and transmit to its serving eNodeB a measurement report indicating the operating-temperature event trigger and perhaps specifying the measured operating temperature.

Further, the eNodeB may be correspondingly configured to read such a measurement report from the WCD, to determine from the report that the WCD's operating temperature is threshold high, and to use that as a basis to trigger handover of the WCD. In practice, if the measurement report also indicates that the WCD has detected coverage of a particular neighbor cell, such as cell 26 for instance, the eNodeB could respond to at least the threshold high operating temperature by triggering handover to that cell. Alternatively, in response to the threshold high WCD operating temperature, the eNodeB could trigger handover of the WCD by engaging in RRC signaling with the WCD to cause the WCD to scan for and report neighbor coverage, such as coverage of cell 26, and by then invoking handover of the WCD to the reported coverage.

Operating temperature of a WCD can be temperature measured internally in the WCD, indicating the temperature at one or more components of the WCD. By way of example, the operating temperature can represent temperature of a wireless communication interface (e.g., radio-frequency transceiver, power amplifier, etc.) in the WCD, a processing unit (e.g., microprocessor, application specific integrated circuit, etc.) in the WCD, or the like. To facilitate measuring such operating temperature, the WCD may be equipped with one or more temperature sensors, such as solid state thermistors, micro wire interfaces, resistance temperature detectors, thermocouples, or others now known or later developed. One or more such temperature sensors could optimally be positioned within the WCD on or in close proximity to one or more components in the WCD to measure operating temperature, and could provide output to a processing unit of the WCD, which could evaluate the provided output to determine the WCD's operating temperature. Further, multiple such temperature readings (from the same or multiple sensors) could be statistically combined to establish a representative measure (e.g., average, maximum, etc.) of the WCD's operating temperature.

It is of course possible that the measured operating temperature of a WCD could be increased or decreased as a result of the ambient temperature of the environment in which the WCD operates, such as temperature of the air surrounding the WCD. To help account for this, the WCD may further be configured to measure ambient temperature as well and to determine a delta (difference) between the measured operating temperature and the measured ambient temperature, and the WCD may additionally be configured with a new measurement-reporting event trigger keyed to that temperature delta. This additional event trigger could be deemed "T2" and could also have a corresponding measurement-ID to facilitate measurement reporting as discussed above. Thus, when the WCD detects that its temperature delta is threshold high (e.g., where the measured operating temperature is threshold higher than the ambient temperature), the WCD could responsively generate and transmit to its serving eNodeB a measurement report indicating the temperature-delta event trigger and perhaps specifying the calculated temperature delta.

The eNodeB may then also be correspondingly configured to read such a measurement report from the WCD, to determine from the report that the WCD's temperature-delta is threshold high, and to use that as a basis to trigger handover of the WCD, in the manner discussed above. In practice, for instance, the eNodeB may trigger handover of the WCD in response to both events T1 and T2 being met, or perhaps just in response to event T1 being met or event T2 being met, possibly considering other factors as well.

Further, the WCD may additionally be configured with another measurement-reporting event trigger keyed to the WCD's operating temperature being lower than a threshold or perhaps being not higher than the T1 threshold (e.g., with suitable hysteresis). This event trigger could be deemed "T3" and could also have a corresponding measurement-ID to facilitate measurement reporting. This trigger could apply in a situation where the WCD has reported the T1 event and perhaps also the T2 event, and where the WCD has as a result been handed over from a first wireless coverage system to a second wireless coverage system. After such handover, the WCD's operating temperature may then decrease to a point (again possibly in relation to ambient temperature) where it may be reasonable for the WCD to hand back to the first wireless coverage system. Thus, upon reporting of the T3 event, the WCD's serving eNodeB may trigger handover of the WCD back to the first wireless coverage system. Alternatively, the T3 event may lead to hand over of the WCD to another wireless coverage system.

The WCD can be configured with these new temperature-based event triggers in much the same way as the WCD is configured with other measurement-reporting event triggers as discussed above. For example, the WCD could be pre-provisioned with one or more temperature-based event triggers, and/or the WCD's serving eNodeB could provision the WCD with the triggers through a broadcast (e.g., SIB) message and/or RRC connection reconfiguration message.

Figure 3:
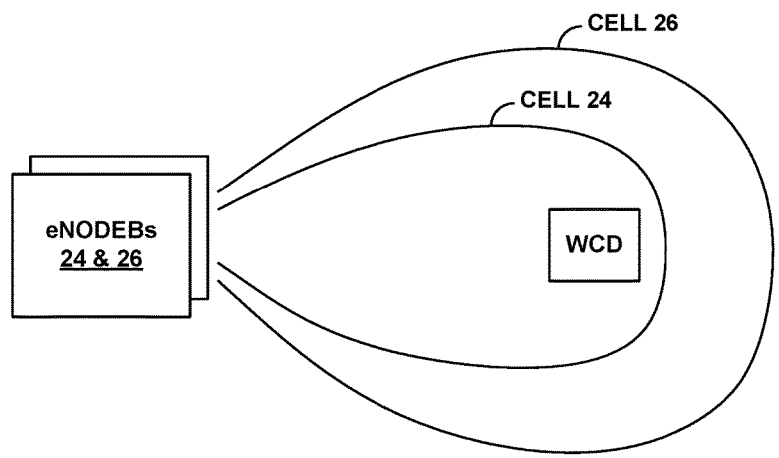
FIG. 3 is a diagram of an example scenario in which features of the present disclosure can be implemented.
Figure 4:
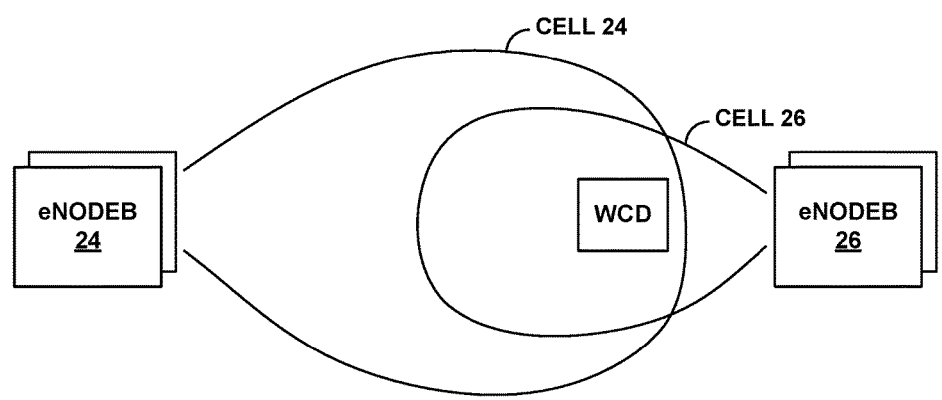
FIG. 4 is a diagram of another example scenario in which features of the present disclosure can be implemented.

As noted above, temperature based handover of a WCD in this process could provide for transitioning the WCD to operate on a different carrier (e.g., different frequency band) and/or to be served by a differently located base station. FIGS. 3 and 4 show example scenarios where these transitions could be usefully carried out.

FIG. 3 illustrates a scenario where eNodeBs 20 and 22 are collocated, possibly sharing the same cell tower and other equipment, but where their respective cells 24 and 26 operate on different frequency bands. In this example, cell 24 operates on a high frequency band, such as band-class 41 in the 2.5 GHz range, and cell 26 operates on a low frequency band, such as band-class 26 in the 800 MHz range. As noted above, path loss is effectively proportional to frequency. Consequently, assuming largely the same transmission power from each eNodeB, cell 24, at a higher frequency, extends a lesser distance from the eNodeBs than cell 26, at a lower frequency. In this example scenario, WCD 16 is shown positioned at the distant edge of coverage of cell 24, also within coverage of cell 26. And the assumption here is that the WCD is served by cell 24.

In the arrangement of FIG. 3, the WCD may monitor its operating temperature as described above and report event T1 and/or event T2 (or one or more other WCD operating-temperature related measurements) to its serving eNodeB 20. This reporting could amount to the WCD itself triggering handover, as the reporting could cause the eNodeB to hand over the WCD. Further, the eNodeB may read the provided measurement report and, based at least in part on a determination that the WCD's operating temperature is threshold high (e.g., on its own and/or by comparison with ambient temperature), trigger handover of the WCD to cell 26. Here, eNodeB 20 may have data indicating that cell 26, at a higher carrier frequency, is also available from collocated eNodeB 22. As cell 26 likely has lower path loss than cell 24, eNodeB 20 may therefore trigger handover of the WCD to cell 26, even without having received from the WCD a report that the WCD detected coverage of cell 26. Here, the handover to cell 26 may thus improve the WCD's coverage and possibly result in reduction of the WCD's operating temperature.

FIG. 4 next illustrates a scenario where eNodeBs 20 and 22 are separately located and provide partially overlapping coverage (e.g., where their cells 24 and 26 partially overlap with each other). In this example, WCD 16 is shown operating at a distant edge of cell 24 and somewhat centrally located in cell 26, and here again the assumption is that the WCD is served by cell 24.

In the arrangement of FIG. 4, the WCD may similarly monitor its operating temperature and transmit to is serving eNodeB 20 a measurement report specifying event T1 and/or event T2, and perhaps further specifying (or specifying in a separate report possibly in response to subsequent query from the eNodeB) that the WCD detects coverage of cell 26, even if events A2, A3 and/or A5 have not occurred. In response to this measurement report, based at least on one or more such reported operating-temperature events, and based on the WCD being within coverage of eNodeB 22, eNodeB 20 may then trigger handover of the WCD to eNodeB 22. Here, the handover of the WCD to eNodeB 22 may likewise improve the WCD's coverage and possibly result in a reduction of the WCD's operating temperature.

Figure 5:
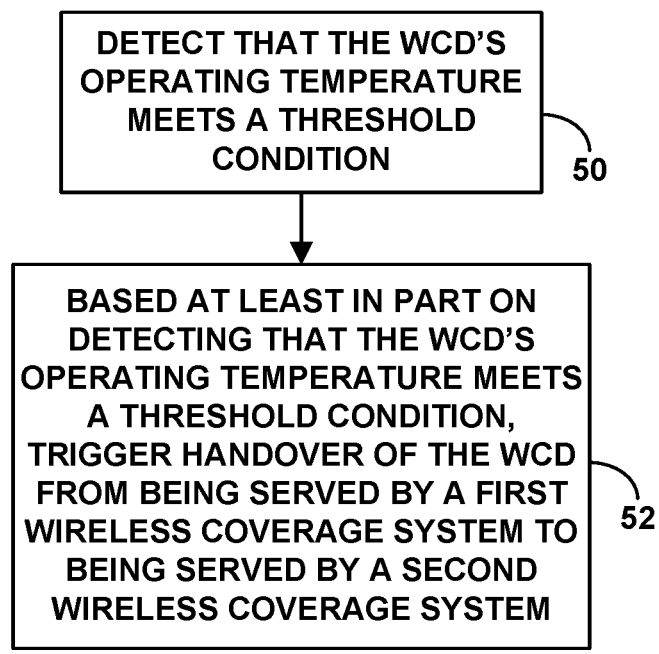
FIG. 5 is a flow chart depicting operations that can be carried out in accordance with the present disclosure.

FIG. 5 is next a flow chart depicting a method for controlling handover of a WCD. As shown in FIG. 5, at block 50, the method includes detecting that an operating temperature of the WCD is meets a threshold condition. And at block 52, the method includes, based at least in part on the detecting that the operating temperature of the WCD meets a threshold condition, triggering handover of the WCD from being served by a first wireless coverage system to being served by a second wireless coverage system.

As discussed above, the first and second wireless coverage systems in this method could differ from each other in carrier frequency of coverage and/or location of coverage. Further, the method could be carried out by the WCD (e.g., with the WCD detecting that its operating temperature is threshold high and, based on that, triggering handover by transmitting a measurement report that leads to handover) or by the WCD's serving base station or other network entity (e.g., by receiving from the WCD an operating-temperature based measurement report and, based on that report, invoking handover). Where the base station triggers the handover, the process may then further include the base station transmitting to the WCD a handover direction message (e.g., in an RRC connection reconfiguration message) directing the WCD to transition from being served by the first wireless coverage system to being served by the second wireless coverage system.

In line with the discussion above, the act of detecting that the operating temperature of the WCD meets a threshold condition (e.g., is threshold high) may thus involve applying one or more temperature sensors within the WCD to measure the operating temperature of the WCD, and determining that the measured operating temperature meets the threshold condition. Further, the act of triggering handover of the WCD comprises may involve transmitting from the WCD, over an air interface to a base station serving the WCD, a signaling message including an operating-temperature measurement event report, and/or receiving and responding to such a measurement report. In addition, as also discussed above, the act of detecting that the operating temperature of the WCD is threshold high may include determining that the operating temperature of the WCD is threshold higher than an ambient temperature of an environment of the WCD.

As further discussed above, the method may also involve the WCD's serving base station providing, and the WCD receiving from the serving base station, a configuration message (e.g., SIB message or RRC connection reconfiguration message) that specifies the threshold level, and the WCD responding to that message by configuring itself (i.e., setting itself) to compare its operating temperature (alone or as a delta calculation as discussed above) with the specified threshold level, to facilitate determining whether the operating temperature of the WCD is threshold high.

Further, the method may also involve the WCD determining that its operating temperature increased at a threshold high rate of change to become threshold high, in which case the triggering of handover could be further based on that determination as well. For instance, the WCD could use such a quick increase in operating temperature as a further basis to provide a temperature-based measurement report to its serving eNodeB, and/or the WCD could indicate in the measurement report the high rate of change, and the eNodeB could use that high rate of change as a further basis for deciding to invoke handover of the WCD.

Yet further, as discussed above, the handover of the WCD could include a transition of the WCD to a lower serving carrier frequency, thereby effectively reducing the WCD's serving carrier frequency. For example, the WCD's serving base station could so reduce the serving carrier frequency of the WCD by selecting as the second wireless coverage system a coverage system that operates on a carrier frequency lower than a carrier frequency on which the first wireless coverage system operates, so that the handover is then to the selected lower-frequency second coverage system.

And as additionally discussed above, a measurement report signaling message that the WCD provides to its serving base station in this process can also include an indication that the WCD has detected coverage of the second wireless coverage system, and triggering handover of the WCD to the second wireless coverage system can be further based on the indication that the WCD has detected coverage of the second wireless coverage system.

Figure 6:
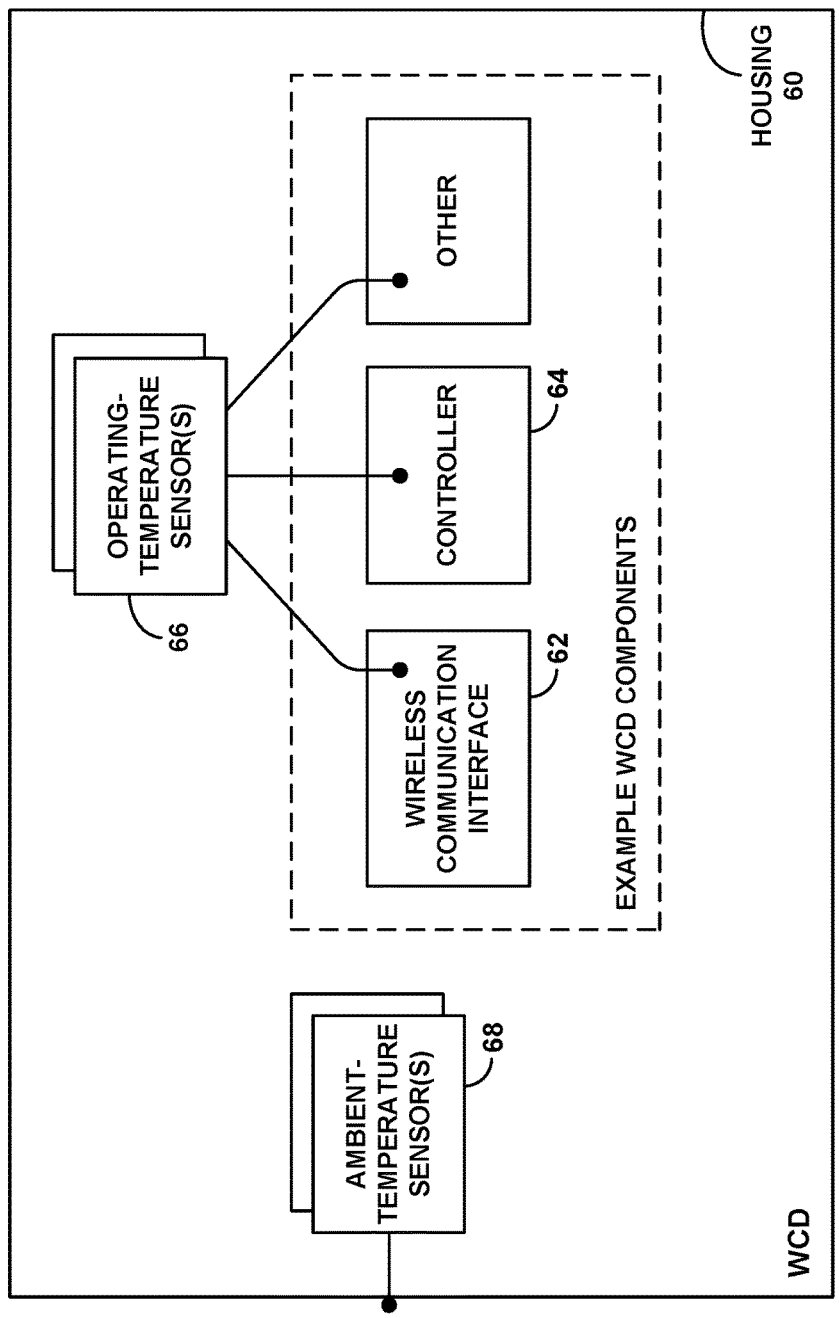
FIG. 6 is a simplified block diagram of an example WCD operable in accordance with the present disclosure.

FIG. 6 is next a simplified block diagram of an example WCD operable in accordance with this disclosure. As shown, the example WCD includes, within a housing 60, various example components such as a wireless communication interface 62 and a controller 64, which could be communicatively linked together by a system bus or other connection mechanism. Wireless communication interface 62 may include a radio-frequency transceiver, power amplifier, and antenna structure, cooperatively configured to facilitate air interface communication as discussed above. And controller 64 could include a processing unit (e.g., microprocessor, application specific integrated circuit, etc.), non-transitory data storage (e.g., one or more volatile and/or non-volatile storage components), and program instructions stored in the data storage and executable by the processing unit to carry out various WCD operations described herein.

As further shown, the WCD includes several example temperature sensors. Each of one or more such temperature sensors 66 is positioned within the WCD to measure operating temperature of the WCD, perhaps with a sensor lead on or at particular internal WCD components such as those noted above. And each of one or more other temperature sensors 68 is positioned within or on the WCD, or alternatively in communication with the WCD, with a sensor lead positioned to measure ambient temperature of the WCD's operating environment. Each of these temperature sensors may then be communicatively linked with controller 64, so that controller 64 can receive temperature readings from the sensors and can act accordingly. Thus, in practice, the controller 64 may be configured to determine, from the at least one of the temperature sensors, the operating temperature of the WCD and, based at least in part on the determined operating temperature, to trigger handover of the WCD.

Specifics described above can apply here as well. For instance, the handover of the WCD could be inter-frequency handover and/or handover to another coverage location served by another base station. Further, the act of the controller triggering handover based on the determined operating temperature could involve the controller determining that the operating temperature of the WCD is threshold high and triggering handover of the WCD in response to determining that the operating temperature of the WCD is threshold high, with the triggering including transmitting to the base station a signaling message including an operating-temperature measurement event report.

Figure 7:
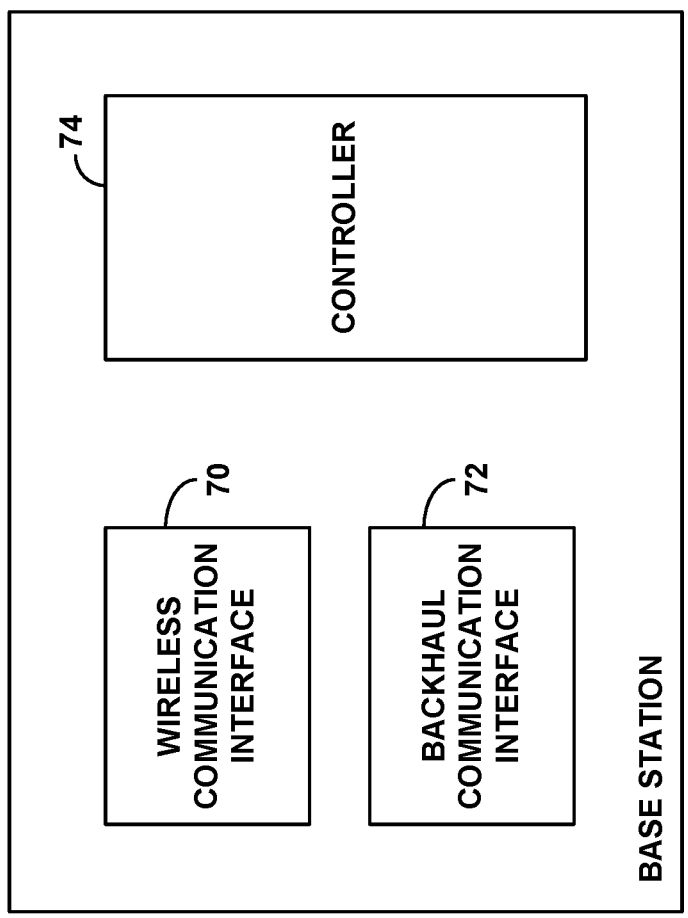
FIG. 7 is a simplified block diagram of an example base station operable in accordance with the disclosure.

Finally, FIG. 7 is simplified block diagram of an example base station operable in accordance with this disclosure. As shown, the example base station includes a wireless communication interface 70 through which to engage in air interface communication with WCDs served by the base station, a backhaul communication interface 72 through which to engage in communication with other base stations and with various network infrastructure, and a controller 74 configured to cause the base station to carry out various base station operations described herein.

In practice, for instance, when the base station is serving a WCD, the base station may receive from a served WCD a signaling message indicating that the WCD's operating temperature is threshold high. And based at least in part on the signaling message indicating that the operating temperature of the WCD is threshold high (e.g., possibly compared with ambient temperature), the base station may then trigger handover of the WCD. Thus, the base station may engage in handover signaling to arrange for handover of the WCD to a target cell, and the base station may direct the WCD to transition to be served by the target cell.

Exemplary embodiments have been described above. Those skilled in the art will understand, however, that changes and modifications may be made to these embodiments without departing from the true scope and spirit of the invention. For example, different makes and models of WCDs may have different operating temperature thresholds. Thus, the process discussed above could further involve selecting a temperature threshold to use for a given WCD based on consideration of the WCD's make or model, or based on one or more other factors. As a result, a temperature threshold used for one WCD could differ from the temperature threshold used for another WCD.

We claim:

1. A method for controlling handover of a wireless communication device (WCD), the method comprising:
   detecting that an operating temperature of the WCD is threshold higher than an ambient temperature of an environment of the WCD, wherein the detecting is based on (i) a determination of a delta between the operating temperature and the ambient temperature and (ii) a determination that the determined delta is threshold high; and
   based at least in part on the detecting that the operating temperature of the WCD is threshold higher than the ambient temperature of the environment of the WCD, triggering handover of the WCD from being served by a first wireless coverage system to being served by a second wireless coverage system.

2. The method of claim 1, wherein the first wireless coverage system and the second coverage system differ from each other in at least one aspect selected from the group consisting of (i) carrier frequency of coverage and (ii) location of coverage.

3. The method of claim 1, carried out by the WCD,
   wherein detecting that the operating temperature of the WCD is threshold higher than the ambient temperature of the environment of the WCD comprises applying one or more temperature sensors within the WCD to measure the operating temperature of the WCD, and determining that the measured operating temperature is threshold higher than the ambient temperature of the environment of the WCD, and
   wherein triggering handover of the WCD comprises transmitting from the WCD, over an air interface to a base station serving the WCD, a signaling message including an operating-temperature measurement event report.

4. The method of claim 3, further comprising determining by the WCD that the operating temperature of the WCD increased at a threshold high rate of change to become threshold higher than the ambient temperature of the environment of the WCD,
wherein the triggering of the handover is based further on the determining by the WCD that the operating temperature of the WCD increased at the threshold high rate of change to become threshold higher than the ambient temperature of the environment of the WCD.

5. The method of claim 1, carried out by a base station serving the WCD,
wherein detecting that the operating temperature of the WCD is threshold higher than the ambient temperature of the environment of the WCD comprises receiving by the base station from the WCD a signaling message including an operating-temperature measurement event report, and
wherein triggering handover of the WCD comprises transmitting from the base station to the WCD a handover direction message directing the WCD to transition from being served by the first wireless coverage system to being served by the second wireless coverage system.

6. The method of claim 5, further comprising, responsive to the operating-temperature measurement event report, reducing by the base station a serving carrier frequency of the WCD by selecting as the second wireless coverage system a coverage system that operates on a carrier frequency lower than a carrier frequency on which the first wireless coverage system operates, wherein the handover is to the selected second coverage system.

7. The method of claim 5, wherein the signaling message also includes an indication that the WCD has detected coverage of the second wireless coverage system, wherein triggering handover of the WCD to the second wireless coverage system is further based on the indication that the WCD has detected coverage of the second wireless coverage system.

8. A wireless communication device (WCD) configured to control handover based on operating temperature of the WCD, the WCD comprising:
a wireless communication interface configured to communicate over an air interface with a base station serving the WCD;
at least one temperature sensor configured to measure operating temperature of the WCD;
at least one ambient-temperature sensor configured to measure an ambient temperature of an environment of the WCD; and
a controller configured to determine from the at least one temperature sensor and the at least one ambient-temperature sensor that the operating temperature of the WCD is threshold higher than the ambient temperature of the environment of the WCD and, based at least in part on determining that the operating temperature of the WCD is threshold higher than the ambient temperature of the environment of the WCD, to trigger handover of the WCD,
wherein determining that the operating temperature of the WCD is threshold higher than the ambient temperature of the environment of the WCD comprises (i) determining a delta between the operating temperature and the ambient temperature and (ii) determining that the determined delta is threshold high.

9. The WCD of claim 8, wherein triggering handover of the WCD comprises at least one operation selected from the group consisting of (i) triggering inter-frequency handover of the WCD and (ii) triggering handover of the WCD from being served by base station to being served by another base station.

10. The WCD of claim 8,
wherein triggering handover of the WCD comprises transmitting to the base station a signaling message including an operating-temperature measurement event report.

11. A base station configured to control handover of a wireless communication device (WCD) based on operating temperature of the WCD, the base station comprising:
a wireless communication interface configured to communicate over an air interface with the WCD; and
a controller configured (i) to receive from the WCD via the wireless communication interface, when the base station is serving the WCD, a signaling message indicating that the operating temperature of the WCD is threshold higher than an ambient temperature of an environment of the WCD and (ii) based at least in part on the signaling message indicating that the operating temperature of the WCD is threshold higher than an ambient temperature of an environment of the WCD, to trigger handover of the WCD.

12. The base station of claim 11, wherein the base station serves the WCD on a first carrier frequency, and wherein triggering handover of the WCD comprises transitioning from serving the WCD on the first carrier frequency to serving the WCD on a second carrier frequency lower than the first carrier frequency.

13. The base station of claim 11, wherein the signaling message also includes an indication that the WCD has detected coverage of another base station, wherein triggering handover of the WCD comprises triggering handover of the WCD to the other base station indicated by the signaling message.

* * * * *